United States Patent

Maison

[15] 3,684,182
[45] Aug. 15, 1972

[54] VARIABLE NOZZLE FOR JET ENGINE

[72] Inventor: Richard L. Maison, San Diego, Calif.

[73] Assignee: Rohr Corporation, Chula Vista, Calif.

[22] Filed: Sept. 8, 1970

[21] Appl. No.: 70,301

[52] U.S. Cl. ....239/265.19, 239/265.25, 239/265.35
[51] Int. Cl. ..........................B63h 11/10, B64c 15/00
[58] Field of Search.......239/265.19, 265.33, 265.37, 239/265.39, 265.43, 265.25, 265.27

[56] References Cited

UNITED STATES PATENTS

| | | | |
|---|---|---|---|
| 3,015,936 | 1/1962 | Brewer et al. | 239/265.19 |
| 2,753,684 | 7/1956 | Greene | 239/265.25 |
| 2,943,444 | 7/1960 | Baxter | 239/265.33 |
| 3,018,620 | 1/1962 | Meyer | 239/265.19 |
| 3,020,712 | 2/1962 | Dolliver | 239/265.19 |
| 3,024,605 | 3/1962 | Nash | 239/265.19 |

*Primary Examiner*—Lloyd L. King
*Attorney*—George E. Pearson

[57] ABSTRACT

Invention is embodied in an airplane having at least one jet engine with its longitudinal axis substantially parallel to the longitudinal axis of the airplane and with a tail pipe discharging rearwardly to produce reaction thrust. A variable nozzle is provided for attachment co-extensively to the tail pipe to receive and control the exhaust gas stream. The nozzle comprises a pair of fixedly mounted side plates laterally spaced and having parallel opposed planar faces, between which are mounted a pair of nozzle sections having predetermined profiles in continuation of the profile of the tail pipe. The outer marginal side walls of the sections are in slidable sealed engagement with the opposed faces of the side plates, and are movable toward and away from the engine axis between stowed and deployed positions to vary the cross sectional area of the exhaust gas flow path and to modify the combined profile of the tail pipe and nozzle for varying flight regimes so that optimum flow-pressure requirements may be satisfied. In addition, the sections may be independently actuated for differential movement which alters the effective thrust axis and provides directional control moments to aid in steering the aircraft or for emergency steering control. Direction of movement of sections at installation determines whether pitching or yawing movements are produced. In multiple engine installations both pitch and yaw control may be provided.

17 Claims, 12 Drawing Figures

INVENTOR.
RICHARD LE ROY MAISON

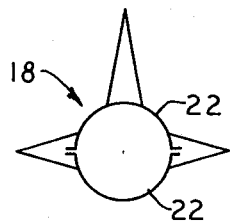
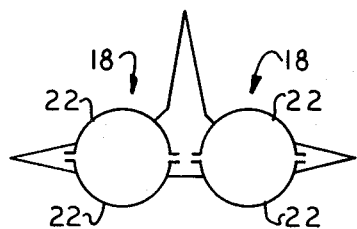
FIG. 8　　　　　FIG. 9
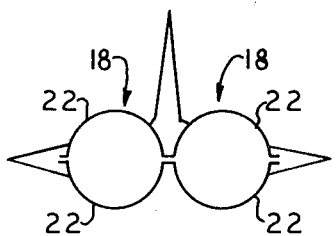
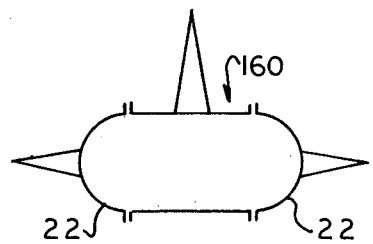
FIG. 10　　　　　FIG. 11
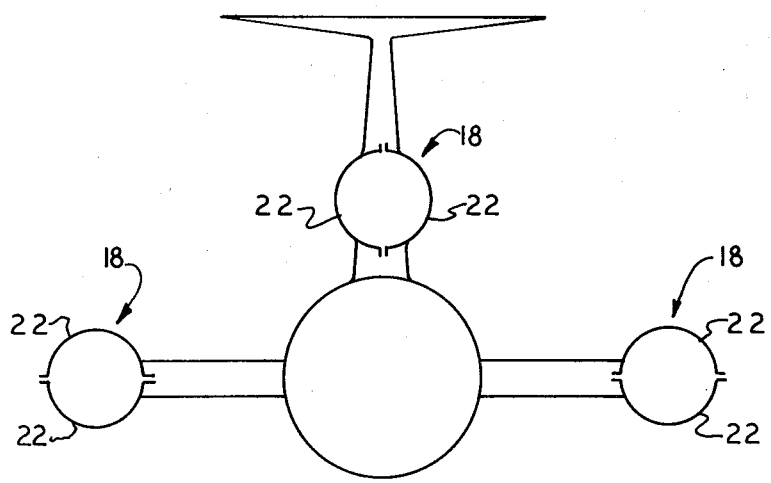
FIG. 12
INVENTOR.
RICHARD LE ROY MAISON
BY
ATTORNEY

VARIABLE NOZZLE FOR JET ENGINE

BACKGROUND OF THE INVENTION

This invention lies in the field of gas turbine engines, commonly called jet engines, which produce reaction thrust by ejecting a high velocity stream of gas from the tail pipe or exhaust nozzle of the gas turbine, and is directed to a system for varying the flow area or profile of the nozzle to achieve optimum operating conditions for varying flight regimes. It is directed more particularly to a variable nozzle system which is relatively simple in construction and which incorporates means to alter the effective thrust axis and also means to accomplish thrust reversal.

The usual prior art variable area nozzle systems achieve area modulation by the use of either multiple petals or variable plug designs. The complex petal design splits the nozzle system into many segments to attain area modulation, and drastically reduces nozzle efficiency. Sliding plates may be used to seal the gaps between the petals to recoup some of the losses but the arrangement adds further complexity. Nozzle plugs may be axially movable or radially expandable and contractible or both, and the nozzle wall may be movable to cooperate with the plug. Obviously these schemes are also complex and involve a thrust efficiency compromise.

SUMMARY OF THE INVENTION

The present invention provides a system which achieves the desired flow area modulation and profile variation with a relatively simple and rugged mechanism and which, in addition, provides thrust vector variation to produce steering control moments. Moreover, it includes means to produce thrust reversal.

Generally stated, the system is adapted for use with one or more jet engines having rearwardly discharging tail pipes and includes a variable nozzle for each engine which attaches to the tail pipe and forms a virtual continuation thereof to receive and control the exhaust gas stream. The nozzle includes a pair of laterally spaced fixed side plates having parallel planar opposing walls between which are located a pair of nozzle sections. The inner walls of the nozzle sections in stowed position comprise all or the major part of the flow-confronting nozzle wall and their longitudinal profiles are predetermined to cooperate with the profile of the tail pipe to satisfy the flow-pressure requirements for normal cruising flight. The two nozzle sections are movable toward and away from the engine axis to vary the cross sectional area of the flow path and also the nozzle profile for other flight regimes. The outer marginal side walls of the sections are in sealed slidable engagement with the side plates to provide nozzle integrity.

The nozzle sections may be pivotally mounted adjacent to their forward ends to swing toward and away from the engine axis or they may be mounted on tracks in the side plates for bodily movement. In all forms, the actuators for the sections may be independently operated to produce differential movement of the sections resulting in angular alteration of the effective thrust line or vector for use as supplemental or emergency steering control. In the case of multiple engines, the nozzles may be installed so that the sections open in different directions to give directional control in various senses.

In the preferred form a blocker door forms the trailing portion of each nozzle section and is pivoted thereto. When the sections are in stowed position the doors may be swung aft to meet at the engine axis, blocking rearward flow of the exhaust gas stream and diverting it laterally and forwardly to produce reverse thrust in the same manner as with a fixed nozzle.

BRIEF DESCRIPTION OF THE DRAWINGS

Various other advantages and features of novelty will become apparent as the description proceeds in conjunction with the accompanying drawings, in which:

FIGS. 8 to 12 are schematic end views illustrating how the mechanism may be embodied in various engine and nozzle arrangements.

DESCRIPTION OF PREFERRED EMBODIMENTS

Figure 1:
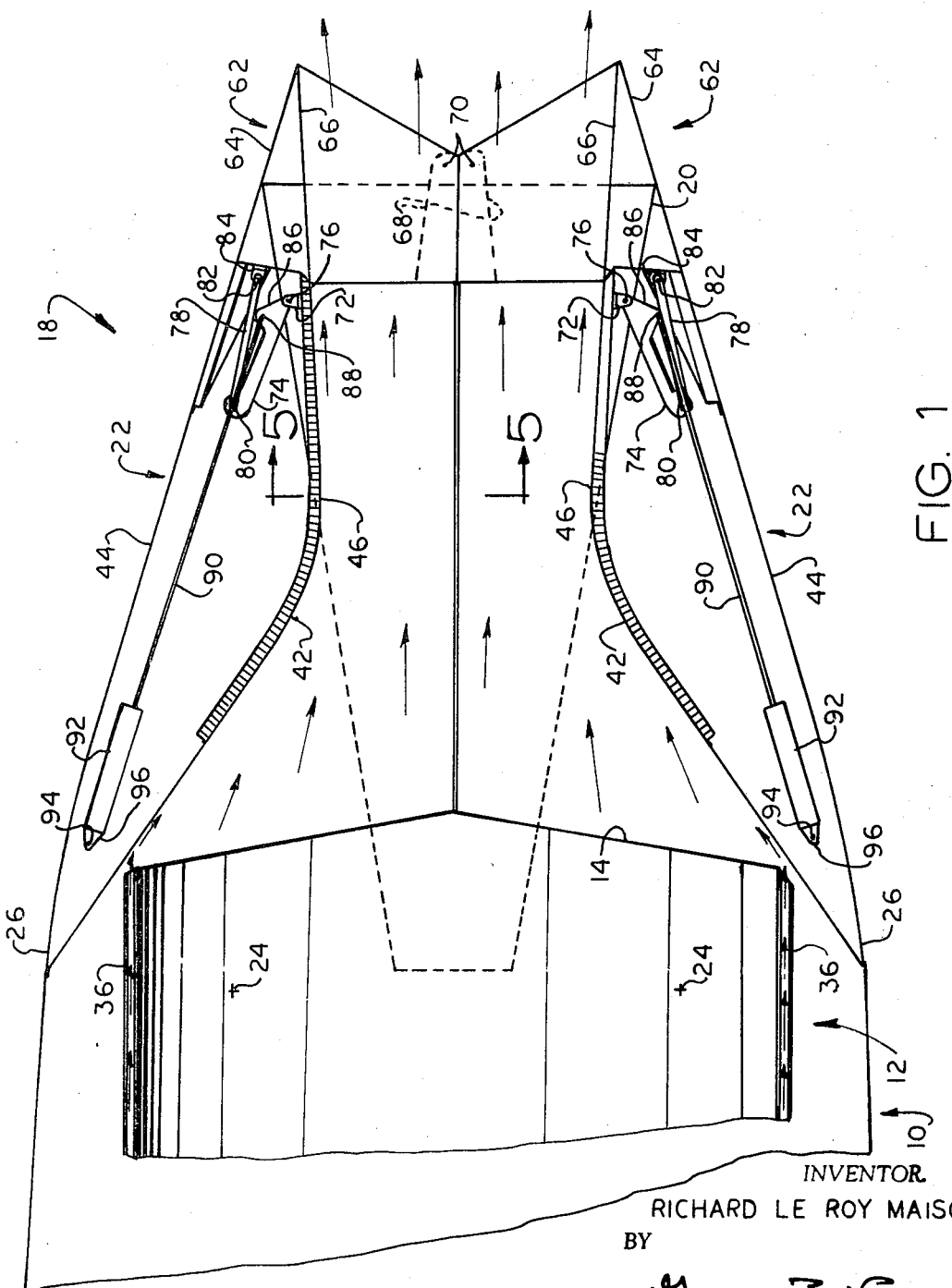
FIG. 1 is a schematic longitudinal sectional view of the aft end portion of a jet engine installation embodying the present invention showing the blocker doors stowed.

The general arrangement and construction of a variable nozzle embodying the invention mounted on an aircraft engine nacelle and tail pipe are illustrated schematically in FIG. 1. The aft portion 10 of a nacelle or other aircraft structure is shown enclosing the aft portion of a tail pipe 12 having an exit edge 14 from which the propellant gas stream of the engine is rearwardly discharged. The tail pipe in the example is generally cylindrical.

Figure 3:
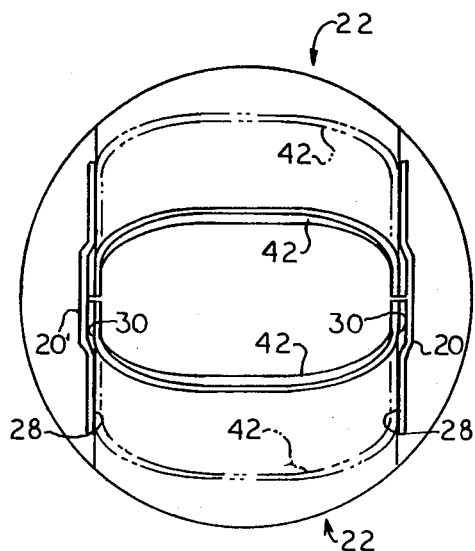
FIG. 3 is an aft end elevational view of the nozzle, the nozzle sections being shown in cruise condition in solid lines and in deployed condition in broken lines.
Figure 5:
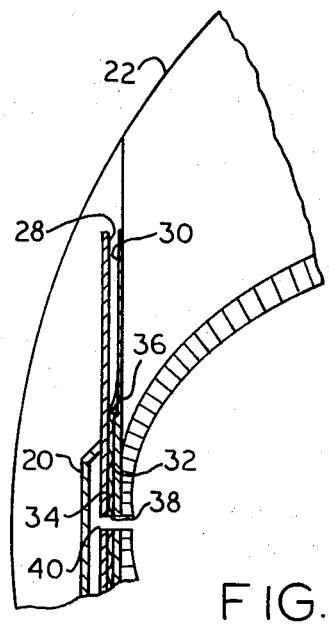
FIG. 5 is an enlarged, fragmentary, sectional view taken on line 5—5 of FIG. 1 and showing the nozzle seal construction.

A variable nozzle 18 is mounted generally co-extensively of the aft end of the tail pipe 12 and comprises a pair of side plates 20 and 20', see FIGS. 1 and 3, fixedly mounted at their forward ends to the nacelle 10, and a pair of generally similar, complementary nozzle sections 22 located between the side plates and pivotally mounted to the nacelle at 24 adjacent to their forward ends 26. As best seen in FIGS. 3 and 5, the side plates 20 are laterally spaced and have inner confronting or opposing faces 28 which are planar and parallel. The outer marginal side walls 30 of the nozzle sections are in slidable engagement with, and are sealed to the faces 28 to permit swinging movement of the nozzle sections toward and away from the engine axis to vary the cross sectional area of the flow path therebetween.

The sealing of nozzle side walls 30 to faces 28 is accomplished by providing along the length of each wall 30 a marginal diaphragm 32 which is longitudinally corrugated as indicated at 34 to provide a labyrinth sealing effect. The side edges of the diaphragm are sealed to each nozzle wall 30 and the corrugated portion is constantly yieldably urged against wall 28 by compressor bleed air supplied through conduit means 36, FIGS. 1 and 5, to the interior of the seal. A small bleed 38 is provided in each seal diaphragm 32 adjacent the split line between the nozzle sections so that any leakage across the seal will be cool compressor bleed air rather than hot exhaust gas. In addition, a branch of conduit means 36 may extend into the interior of side plate 20 and bleed through openings 40, see FIG. 5, for the same purpose.

The cross sectional shape of the nozzle passage for the exhaust gas is shown in FIG. 3, where the solid lines show the inner walls 42 of the two nozzle sections 22 co-operating in stowed position to define a laterally elongate oval, which is a suitable configuration for optimum performance of one particular installation for which the nozzle was designed. It will be understood that for other installations the cross section may be a circle or other shape dictated by design considerations. In the form shown the marginal edges of the sections meet to define the entire nozzle, but in some cases the walls 28 of the side plates may extend inward along the split line to define a portion of the nozzle inner wall. The broken lines in FIG. 3 indicate the positions of the inner walls when the nozzle sections are deployed, in which phase the faces 28 of the side plates define a substantial portion of the total inner wall of the nozzle.

Figure 2:
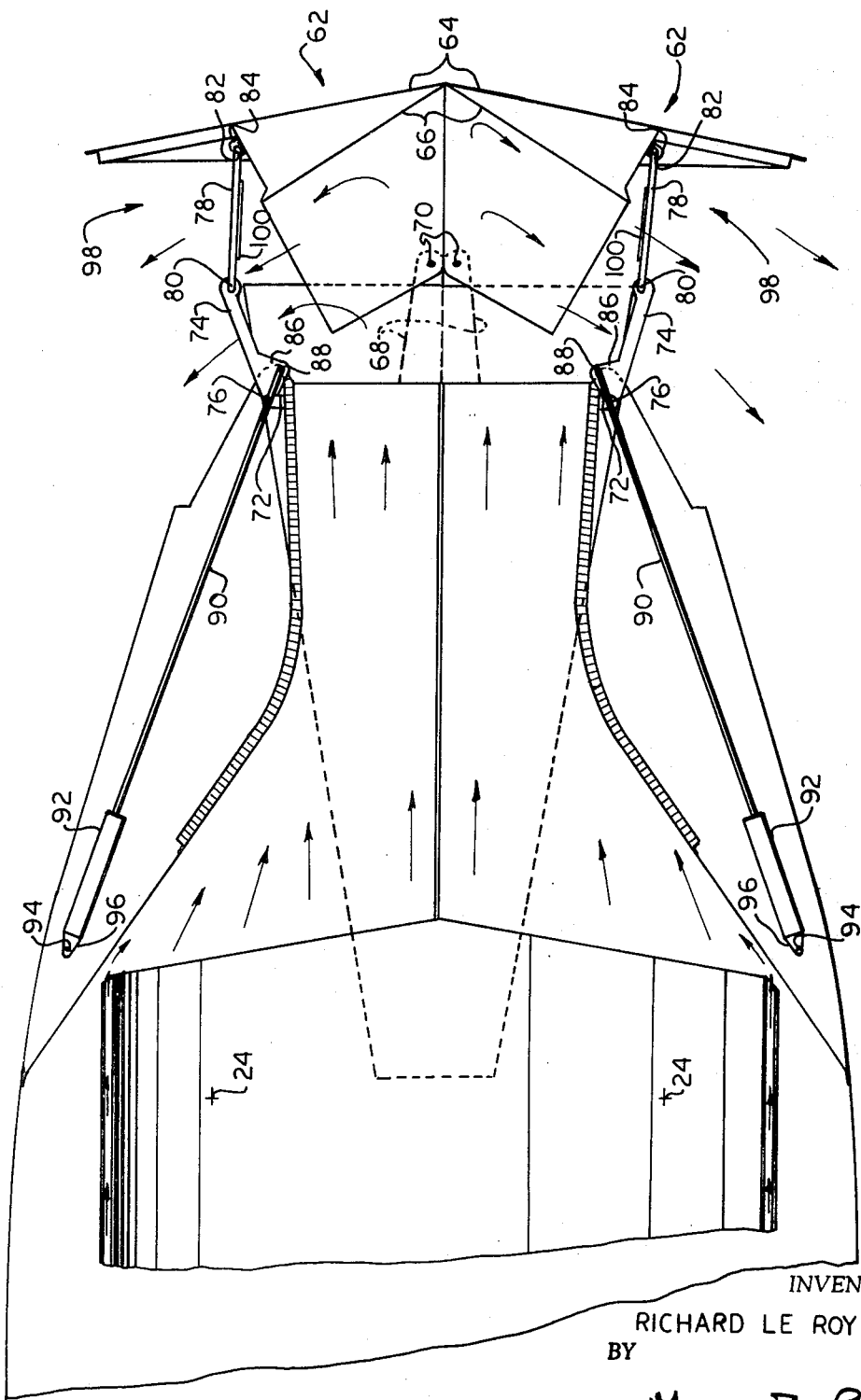
FIG. 2 is a view similar to FIG. 1 showing the blocking doors deployed.

It will be noted in FIGS. 1, 2 and 5 that each of the nozzle sections 22 is a box structure, a portion of which is quite thick, in fact considerably thicker than the fixed side plates. This thickness gives it a very high I-value which more than compensates for the weakening effect of splitting the nozzle along a mid-plane. The outer wall 44 merges smoothly into the wall of the nacelle at forward end 26 in both stowed and deployed positions to maintain a satisfactory streamline. The inner wall 42 merges into the exit edge 14 of the nozzle and converges aft to form a throat 46 and then diverges slightly to the trailing edge. The profile could be such that the nozzle is a simple convergent nozzle which would become a convergent-divergent nozzle upon deployment, but the preferred form shown is convergent-divergent in all phases. The predetermined profile is designed to cooperate with the predetermined profile of the tail pipe for best cruising performance in stowed position and to provide a modified combined profile giving optimum performance when deployed for afterburner operation.

Figure 4:
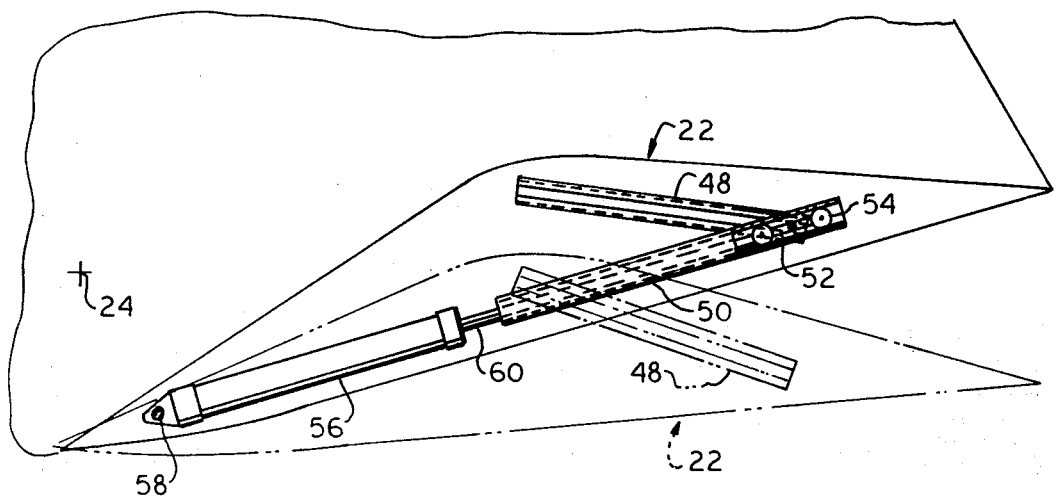
FIG. 4 is an enlarged, fragmentary, schematic side elevational view showing one form of nozzle section actuating mechanism in cruise condition in solid lines and in deployed condition in broken lines.

Suitable means for moving each nozzle section between stowed and deployed position is shown in FIG. 4. A guide track 48 is mounted on the outer side of each nozzle section 22 in a generally fore and aft direction as shown. A similar guide track 50 is mounted to the inner face 28 of each side plate 20 at an angle to overlap track 48. A carriage 52 is provided with guide followers in the form of rollers 54 which extend in opposite directions to engage simultaneously in both tracks. An actuator cylinder 56 is pivotally connected at 58 to the structure of a side plate and extends and retracts a piston rod 60 which is connected at its free end to the carriage. With the carriage in the aft position the tracks overlap at their aft ends and the nozzle section is stowed as shown in solid lines. As the actuator draws the carriage forward, track 48 is forced to move radially outward until the carriage reaches the forward position with the tracks overlapped at their forward ends and each nozzle section is now in its fully deployed broken line position.

Another feature of the invention, illustrated in FIGS. 1 and 2, is the provision of a thrust reversal mechanism integrated with the variable nozzle. The streamlined aft portion of each nozzle section is formed by a blocker door 62 having an outer wall 64 completing the contour of outer wall 44 of the section and an inner wall 66 completing the contour of the inner wall 42 of the section. A bracket 68 extends aft from the nozzle at each side and the walls of the blocker door are mounted to the brackets by pivots 70. The mechanism for operating the doors is shown in FIGS. 1 and 2, and the doors are shown in reversing position in FIG. 2. The doors may be partially or fully deployed when the nozzle sections are stowed to achieve any desired degree of thrust reversal in the air or on the ground.

The actuating mechanism includes a first bracket 72 mounted internally of the nozzle section, a first link 74 pivotally connected to the bracket at 76, a second link 78 pivotally connected to the first link at 80 and pivotally connected at 82 to a second bracket 84 secured to the inner wall of the door. An ear 86 is formed on the first link 74 and is pivotally connected at 88 to the free end of a piston rod 90 which extends from actuator cylinder 92. The cylinder is pivotally connected at 94 to a bracket 96 secured to the internal structure of the nozzle section. Extending movement of the piston rod acts through the lever arm of the ear 86 to swing the linkage from folded to extended position, swinging the blocker doors aft until their trailing edges meet at the center line as seen in FIG. 2. Retracting movement of the piston rod reverses the process.

Considering FIG. 2, it will be noted that the location of pivotal mounting 70 is selected to cause the blocker door to swing outwardly, rearwardly, and inwardly until the trailing edges of the two doors meet at a position well aft of their stowed location. This movement produces a substantial gap between the door and the aft edge of the main body of the nozzle section to define a lateral outflow passage 98 for the exhaust gas stream to issue laterally and forwardly for reverse thrust. The doors in deployed position diverge forwardly to impart a forward flow component and this is further aided by the provision of an end plate 100, mounted on link 78 in a position to deflect the issuing stream.

Figure 6:
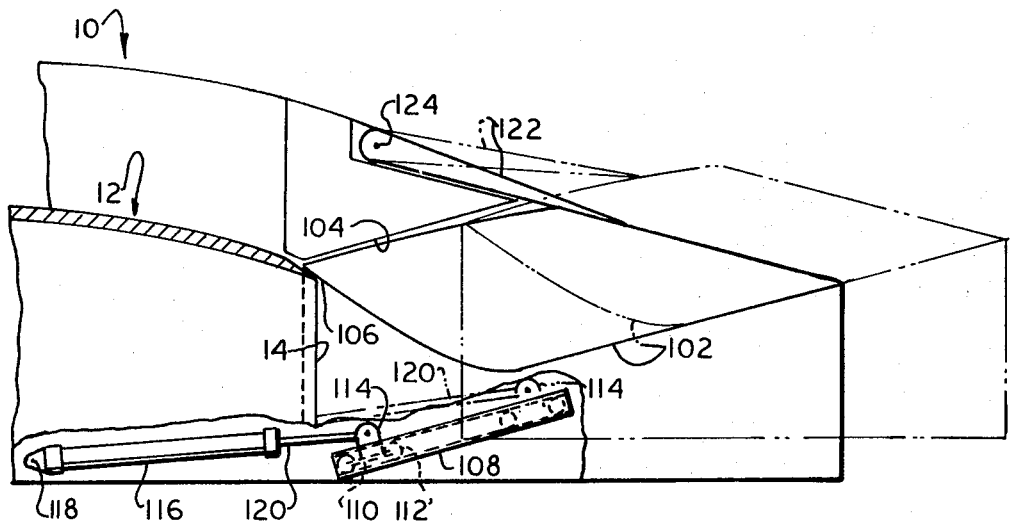
FIG. 6 is a schematic view similar to FIG. 1 showing a modified form of nozzle section actuating mechanism.
Figure 7:
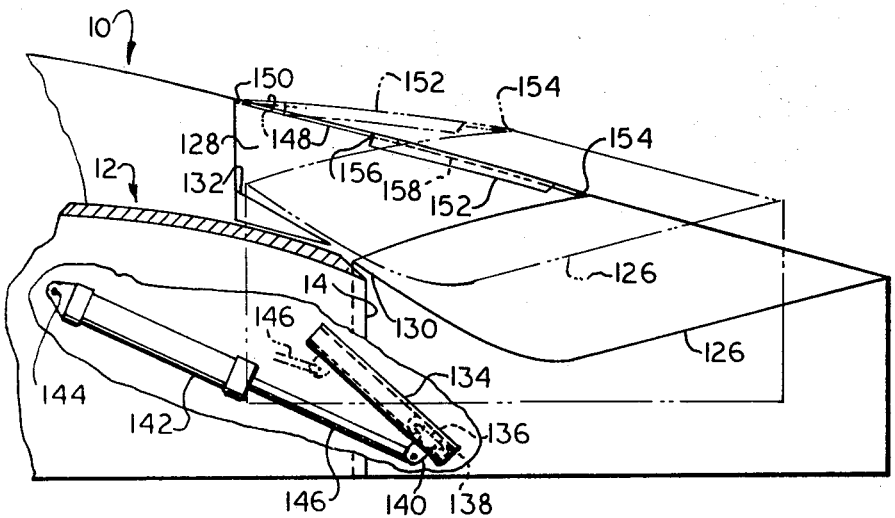
FIG. 7 is a view similar to FIG. 6 showing a further modified form of nozzle section mounting mechanism.

The modified nozzle sections of FIGS. 6 and 7 are mounted between side plates of the same type as the first form and may also be provided with the same type of blocker doors operating in the same way. The primary difference is that they are bodily moved toward and away from the engine axis along any suitable line of travel. The nozzle section 102 of FIG. 6 forms a continuation of tail pipe 12 and defines a convergent-divergent nozzle. An inner wall 104 of the nacelle diverges rearward and defines a portion of the inner nozzle wall when the nozzle sections are moved outwardly, the leading edge 106 of the section being in sealed slidable engagement with wall 104.

A guide track 108, diverging rearward, is mounted to the face 28 of each side plate, and a carriage 110 is attached to each outer marginal side wall of the nozzle section. The carriage is provided with guide followers in the form of rollers 112 to engage in the tracks and also with an actuating ear 114. An actuator cylinder 116 is pivotally connected at 118 to the nacelle structure and carries a piston rod 120 which is pivotally connected at its free end to ear 114. Extension of the piston rod moves the nozzle section aft and out from the stowed solid line position to the deployed dotted line position. While there is some break in the combined profile during deployment there is no significant loss of flow efficiency. A petal 122 is pivotally connected at 124 to the aft portion of the nacelle and rides against the outer wall of the nozzle section to maintain the streamline.

The nozzle section 126 of FIG. 7 likewise forms a continuation of tail pipe 12. In this case a forwardly diverging cavity 128 is formed in nacelle 10 to receive the nozzle section when it is deployed, and the leading edge 130 is in sealed slidable engagement with wall 132.

The actuating means includes a guide track 134 mounted to each side plate and diverging forward. Each outer marginal side wall of the nozzle section is provided with a carriage 136 having guide followers in the form of rollers 138 engaging in the guide tracks, and with an actuating ear 140. Actuator cylinder 142 is pivotally connected to the nacelle structure at 144 and carries a piston rod 146 pivotally connected at its free end to ear 140. Extension of the piston rod moves the nozzle section forward and out from the stowed solid line position to the deployed dotted line position. The profile of the inner wall of the combined tail pipe and nozzle is maintained smoother than in the previous embodiment.

In order to maintain a smooth outer contour, two petals are provided. A first petal 148 is pivotally connected at its forward end to the aft end of the nacelle at 150 and a second petal 152 is pivotally connected at its aft end to the maximum contour locus of the nozzle section at 154. A link 156 connected to the aft edge of petal 148 carries a guide follower which slides in a T-shaped track 158 in the upper surface of petal 152. As the nozzle section moves outward and forward, the sliding connection guides the two petals into overlapping relation.

The schematic showings of FIGS. 8 to 12 illustrate a variety of installations to which the system of the invention is applicable for the purpose of achieving a substantial measure of steering control, either in the event of an emergency or for the purpose of supplementing the normal steering controls. FIG. 8 shows a single engine mounted on the axis of the airplane with nozzle 18 so arranged that the two nozzle sections deploy upward and downward. With this arrangement the nozzle sections 22 may be moved upward and downward differentially to produce pitching moments. If the nozzle is rotated 90°, the same movements of the nozzle sections will produce yawing moments.

FIGS. 9 and 10 show a pair of nozzles, one located at each side of the airplane axis. In FIG. 9 the nozzles are separate and distinct and in FIG. 10 they are close coupled and act in unison. In either case they operate as above to produce steering control moments.

In FIG. 11 the nozzle 160 is laterally elongate and has one nozzle section 22 movable laterally at each side. In all phases, the planar center portions form part of the inner nozzle wall at all times, and sections 22 may be moved differentially for yaw control.

FIG. 12 shows an arrangement which is of particular interest with respect to the new generation of three engined jet airplanes. In this arrangement one nozzle is located in a vertical plane containing the airplane axis and the nozzle sections move laterally to provide yaw control. The other two nozzles are located outboard to each side of the airplane axis either on stub supports or on the wings and the nozzle sections move vertically to provide pitch and roll control. This is particularly valuable because in the event that one outboard engine fails and the other produces a yawing effect, the center nozzle can be modulated to overcome the yaw and maintain a straight course without using up the effect of the yaw trim aerodynamic controls.

It will be apparent that the system of the present invention, even when applied to an airplane with a single jet engine, provides multiple thrust controlling functions. First, when the nozzle sections are modulated in unison and to the same extent, they provide direct axial thrust control for varying flight regimes by varying the flow area and the profile. Second, differential movement of the nozzle sections angularly alters the thrust vector to produce steering control moments. Third, the provision of blocker doors integrated with the nozzle sections produces thrust reversal.

Having thus described the invention, what is claimed as new and useful and is desired to be secured by U. S. Letters Patent is:

1. A thrust controlling mechanism for use in combination with an airplane provided with at least one jet engine having a longitudinal axis substantially parallel to the longitudinal axis of the airplane and having a tail pipe with a fixed profile adapted to discharge rearwardly to produce reaction thrust, said mechanism comprising: a variable nozzle for connection to the tail pipe to receive and control the rearward flow of the exhaust gas stream; the nozzle including a pair of fixedly mounted laterally spaced side plates having parallel planar opposing faces; and a pair of nozzle sections located between the side plates and having inner walls provided with predetermined longitudinal profiles and forming virtual continuations of portions of the tail pipe to control the amount and character of flow of the exhaust gas stream; the nozzle sections having outer marginal side walls in slidable sealing engagement with the opposing faces of the side plates; the nozzle sections being movable to a stowed position toward and a deployed position away from the engine axis to vary the cross sectional area of the flow path and to vary the combined longitudinal profile of the tail pipe and nozzle sections said variable nozzle is deployed through a plurality of intermediate positions from stowed to deployed for varying said cross-sectional flow path from convergent in the stowed position to convergent-divergent in the full deployed position.

2. A system as claimed in claim 1; the inner walls of the two nozzle sections combining in stowed position to form the entire inner flow-confronting wall of the nozzle.

3. A system as claimed in claim 1; portions of the opposing walls of the side plates defining portions of the nozzle inner wall at least when the nozzle sections are displaced outward from their stowed positions.

4. A system as claimed in claim 1; each marginal side wall of each nozzle section being provided with a generally longitudinally extending pressurized seal resiliently urged into contact with the adjacent wall of a side plate.

5. A system as claimed in claim 4; and conduit means to supply compressor bleed air to the interiors of the seals to provide pressurization.

6. A system as claimed in claim 1; each of the nozzle sections being pivotally mounted adjacent to its forward end to enable the sections to swing toward and away from the engine axis to vary the flow path area and the longitudinal profile.

7. A system as claimed in claim 6; a first guide track mounted to each marginal side wall of each nozzle section and extending in a predetermined direction in a fore and aft plane; a second guide track mounted to a wall of each side plate for each guide track on the nozzle sections and extending in planes parallel to the planes of the first guide tracks but at predetermined angles thereto and in overlapping relation; a carriage having guide followers movably mounted in each track of a set of two cooperating first and second guide tracks; and actuator means to force the guide follower from end to end of the corresponding tracks of a set to force the nozzle sections toward and away from the engine axis.

8. A system as claimed in claim 1; each of the nozzle sections being slidably mounted for bodily movement toward and away from the engine axis to vary the flow path area and the longitudinal profile.

9. A system as claimed in claim 8; including rearwardly diverging guide tracks; the nozzle sections being slidably mounted on said tracks to move from stowed position aft and laterally outward from the engine axis toward deployed position.

10. A system as claimed in claim 8; including forwardly diverging guide tracks; the nozzle sections being slidably mounted on said tracks to move from stowed position forward and laterally outward from the engine axis toward deployed position.

11. A system as claimed in claim 1; the nozzle sections being actuatable independently to produce differential movement and alter the effective thrust axis to provide directional control moments.

12. A system as claimed in claim 1; the major portions of the longitudinal cross sections of the movable nozzle sections being substantially thicker than the side plates to increase their individual resistance to exhaust gas pressures in compensation for division of the nozzle into separate portions.

13. A system as claimed in claim 1; and a blocker door forming the aft portion of each nozzle section and pivotally mounted to the main body of the section; the blocker doors being so dimensioned and located that their aft edges meet at a central plane in deployed position when the nozzle sections are in stowed position; the doors being spaced aft of the main bodies of the sections in deployed position to define lateral discharge passages for the exhaust gas stream to produce reverse thrust.

14. A system as claimed in claim 1; including a pair of engines, one located at each side of the longitudinal axis of the airplane; the nozzle sections of each engine being actuatable independently to produce differential movement and alter the effective thrust axis to provide directional control moments.

15. A system as claimed in claim 14; the nozzle sections of each engine being movable upward and downward with respect to a generally horizontal plane containing the longitudinal axis of the airplane to provide pitching moments.

16. A system as claimed in claim 1; the nozzle having a laterally elongate cross section with a movable nozzle section at each lateral margin; each nozzle section being movable laterally in a generally horizontal plane toward and away from the engine axis; and the nozzle sections being actuatable independently to produce differential movement and alter the effective thrust axis to provide yawing moments.

17. A system as claimed in claim 1; including a first engine having a longitudinal axis parallel to the longitudinal axis of the airplane and located in a vertical plane containing the longitudinal axis of the airplane; and at least a pair of outboard engines having longitudinal axes parallel to and spaced laterally from the longitudinal axis of the airplane; the nozzle sections of each engine being actuatable independently to produce differential movement and alter the effective thrust axis to provide directional control moments; the nozzle sections of the first engine being movable laterally to provide yawing moments, and the nozzle sections of at least some of the outboard engines being movable vertically to provide pitching moments and/or rolling moments.

* * * * *